H. B. FAY.
Coffee Pot.
No. 25,890.
Patented Oct. 25, 1859.
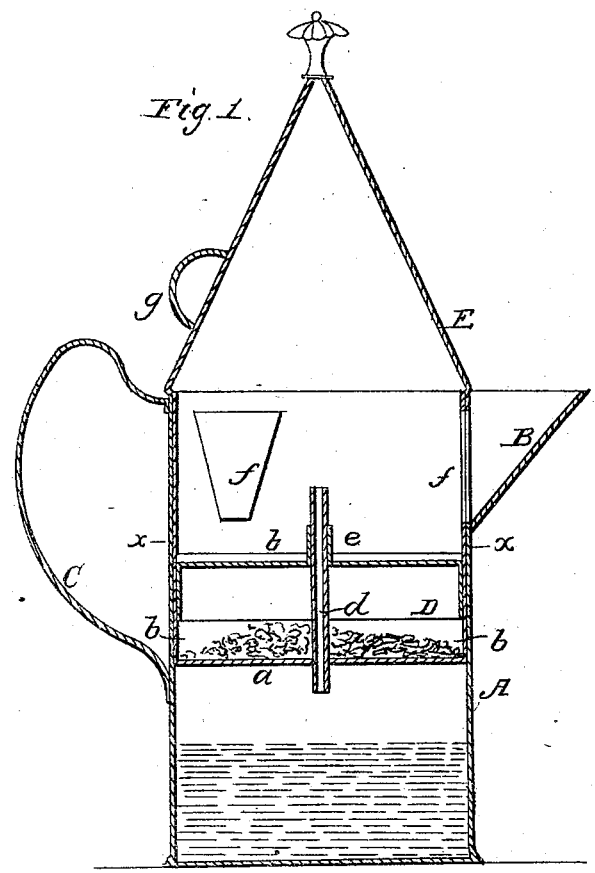
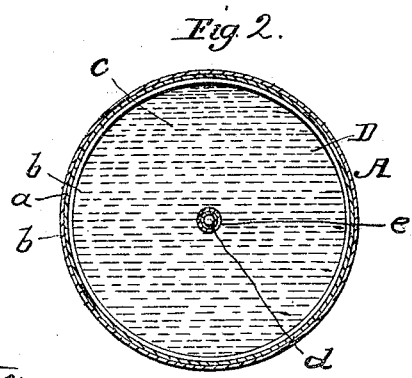
Witnesses:
Inventor.

UNITED STATES PATENT OFFICE.

H. B. FAY, OF NEW YORK, N. Y.

COFFEE-POT.

Specification of Letters Patent No. 25,890, dated October 25, 1859.

*To all whom it may concern:*

Be it known that I, H. B. FAY, of the city, county, and State of New York, have invented a new and Improved Coffee-Pot; and I do hereby declare that the following is a full, clear, and exact description of the same, reference being had to the accompanying drawing, forming a part of this specification, in which—

Figure 1 represents a vertical central section of my invention. Fig. 2 is a horizontal section of ditto, taken in the plane indicated by the line $x\ x$, Fig. 1.

Similar letters of reference in both views indicate corresponding parts.

In order to make good coffee, and to extract all the flavor contained in the grindings it is necessary that the liquid in the pot ought to be kept in contact with the grindings as long as possible, without, however, allowing the coffee to mingle with the grindings and carry off some of it.

To obtain this object fully is the aim of my invention, which consists in arranging between the spout and the liquid an adjustable double strainer, which contains the grindings, and through which the liquid when it begins to boil passes up, and as it cools passes down again, and as the coffee is poured out for use it passes for the third time through the grindings before it reaches the spout. Provision is also made for the escape of the air from below the strainers by means of a tube in the center, which at the same time serves as a handle to take out or move the strainers, and as a guide for the top strainer.

To enable those skilled in the art to make and use my invention I will proceed to describe it.

The pot, A, is made perfectly cylindrical, with a spout, B, on one, and a handle, C, on the opposite side. Fitted into the inside of said pot is the double strainer, D, that consists of the bottom strainer, $a$, which is furnished with a rim, $b$, to receive the top strainer, $c$. A tube, $d$, in the center of the bottom strainer, $a$, serves to adjust the strainers according to the quantity of liquid in the pot, and at the same time this tube forms a guide for the top strainer, $c$, which has a sleeve, $e$, secured in its center to slide over the tube, $d$. The top strainer is further guided by the rim, $b$, which fits closely to the inside of the pot, and to the outside of the top strainer, $c$, as clearly shown in Fig. 2.

The top, E, fits nicely into the upper part of the pot. This top has the form of a cone not only to give peculiarity to the appearance of my pot but also for the purpose of making room for the tubular stem, $d$, of the strainer. That portion of the top, which extends down into the pot, is furnished with several openings, $f$, and if the contents of the pot are to be poured out the top is turned by means of an extra handle, $g$, until one of the openings, $f$, registers with the spout, B, as shown in Fig. 1. As long as none of these openings registers with the spout the pot is closed. By these means the flavor can be preserved and the pot kept closed without additional fixtures.

In order to use my pot water is poured into the same and the grindings are placed between the two strainers, $a$ and $c$. The strainer is now adjusted until it stands close over the water, and the pot, after being closed, is placed on a stove or to the fire. As soon as the water begins to boil it rises through the grindings and when done boiling it sinks back again passing through the grindings for the second time. During this last stage of the operation the tube, $d$, is of great value, as the same permits the air to escape from, and to enter at that part of the pot between the strainer and the liquid, so that the water is not prevented sinking down. After the coffee has thus been fully extracted and when it is ready for use it is poured out, and it passes through the grindings for the third time, so that it preserves the flavor more perfectly than those coffee pots which are now in use.

What I claim as new, and desire to secure by Letters Patent, is:—

The arrangement of the tube $d$, in combination with the adjustable double strainer, D, that is arranged in a pot, A, between the spout and the liquid, substantially as and for the purpose specified.

H. B. FAY.

Witnesses:
W. HAUFF,
M. M. LIVINGSTON.